United States Patent [19]

Booth

[11] 4,333,975
[45] Jun. 8, 1982

[54] FLAT GASKET LAMINATE OF EXPANDED GRAPHITE FOIL AND METALLIC REINFORCEMENT LAYER

[75] Inventor: Geoffrey Booth, Huddersfield, England

[73] Assignee: Flexitallic Gaskets Limited, Heckmondwike, England

[21] Appl. No.: 213,504

[22] Filed: Dec. 5, 1980

[30] Foreign Application Priority Data

Dec. 15, 1979 [GB] United Kingdom ................. 7943297

[51] Int. Cl.³ .......................... B32B 3/02; F16J 15/00
[52] U.S. Cl. ......................................... 428/65; 428/33; 428/192; 428/408; 428/457; 428/402; 277/235 B
[58] Field of Search ....................... 428/33, 64, 65, 66, 428/402, 408, 192, 312, 313; 277/235 B

[56] References Cited

U.S. PATENT DOCUMENTS 2,027,847  1/1936  Victor et al. ........................ 428/134
2,159,355  5/1939  Goetze ................................ 428/122
3,404,061  10/1968  Shane et al. ..................... 428/408 X
4,083,570  4/1978  Sugawara ....................... 277/235 B

FOREIGN PATENT DOCUMENTS 1412141  10/1975  United Kingdom .

*Primary Examiner*—P. Ives
*Attorney, Agent, or Firm*—Cushman, Darby & Cushman

[57] ABSTRACT

A flat gasket comprises a laminate of layers of expanded graphite foil and a metallic reinforcement layer, the graphite foil layers being so disposed as to overlap with and enclose the reinforcement layer within the gasket in relation to at least one edge thereof, said one edge being that edge of the gasket which in use may be exposed to an aggressive environment. Such an aggressive environment may be inside and/or outside the parts joined by the gasket. The reinforcement layer may project beyond the graphite foil layers at the opposite edge to said one edge, the projecting portion constituting locating means for the gasket in use or during installation.

3 Claims, 2 Drawing Figures

FLAT GASKET LAMINATE OF EXPANDED GRAPHITE FOIL AND METALLIC REINFORCEMENT LAYER

This invention relates to flat gaskets of the kind used to join flanged parts such as pipes. In particular, it relates to flat gaskets made from expanded graphite.

THE PRIOR ART

It has been known for many years that expanded graphite particles tend to coalesce on the application of pressure. Foils made in this way from expanded graphite have been used as packing materials for rotary shaft seals. They have also been used in the manufacture of flat gaskets. For example, U.S. Pat. No. 4,083,570 discloses the use of a minor amount of expanded graphite foil in a very small portion of an automotive cylinder head gasket. However, the graphite foil is protected by metal; only a part of it is exposed, so that the fragility of the graphite foil is not a significant factor.

BRIEF DISCUSSION OF THE INVENTION

According to the present invention a flat gasket comprises a laminate of layers of expanded graphite foil and a metallic reinforcement layer, the graphite foil layers being so disposed as to overlap with and enclose the reinforcement layer within the gasket in relation to at least one edge thereof, said one edge being that edge of the gasket which in use may be exposed to an aggressive environment. Such an aggressive environment may be inside and/or outside the parts joined by the gasket, of course. The graphite foils preferably overlap said one edge so as to extend therefrom.

The graphite foils are made from expanded graphite, which is noted for its good resistance to aggressive environments, although it is not very strong when compared to many other gasket materials.

The invention can therefore accomplish two tasks in that it provides structural reinforcement for a fragile, expensive material and at the same time it enables the reinforcement to be made from a relatively cheap material, because the reinforcement itself is not exposed to the potentially aggressive environment to be sealed by the gasket. This is contrary to conventional laminated gasket constructions where the metallic reinforcement layer and the gasket material are coterminous and where in fact the reinforcement layer often encloses the gasket material more or less completely, as in the automotive cylinder head gasket referred to earlier or a metal jacketed gasket, for example, a heat exchanger gasket.

DESCRIPTION OF EMBODIMENTS

The gasket may be in the form of a flat annulus of any diameter, or it may be non-circular, depending on the shape of the parts between which it is to be used. The limiting factor may be the maximum size of the sheet of graphite from which the graphite foils are cut, but it will more usually be the maximum size of the metal sheet from which the reinforcement is cut. However, by adopting the end-to-end joining technique disclosed in UK Pat. No. 1,412,141, it is possible to build up a gasket of practically any desired size or shape. Furthermore by doing this, it is possible to install such a gasket in circumstances where there is a central obstruction between/inside the parts to be joined. This may well obviate the need for expensive and/or extensive dismantling work, simply in order to fit a new gasket. Reactor vessels containing shaft driven stirrers are a notable illustration of where this preferred gasket construction is advantageous. Similar considerations apply where access is limited and it is only possible to separate the flanges by a small amount. It follows that even for a circular gasket which can be made in one piece, it may still be convenient to use the joining techniques just mentioned. The gasket can be cut through at one point so as to form a dovetail joint, the mating parts of which can be engaged with one another after installing the gasket around some central obstruction and between a pair of flanges to be joined. After engaging the mating parts, the area can be sealed by covering the joint with thin pieces of graphite foil on each side of the gasket. In use, these pieces become almost integral with the rest of the foil by virtue of being clamped to it.

Where the aggressive environment is, say, only present at one edge of the gasket, the metallic reinforcement can advantageously extend beyond the graphite at the opposite edge of the gasket, so as to form a peripheral locating flange. Usually this will be to the outside of the gasket, of course. As centering a large diameter gasket can be a difficult and critical exercise, the use of such a peripheral flange to accurately locate the gasket in relation to the mounting bolts can be a valuable and time-saving feature. It may also save a considerable amount of very expensive graphite foil, because the latter is only really essential in the actual area where sealing is to take place.

DESCRIPTION OF PREFERRED EMBODIMENTS

Figure 1:
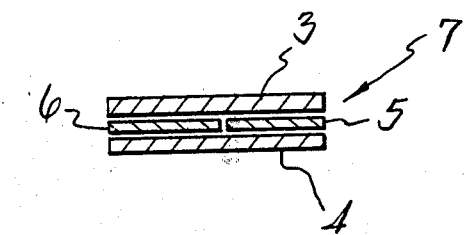
Figure 2:
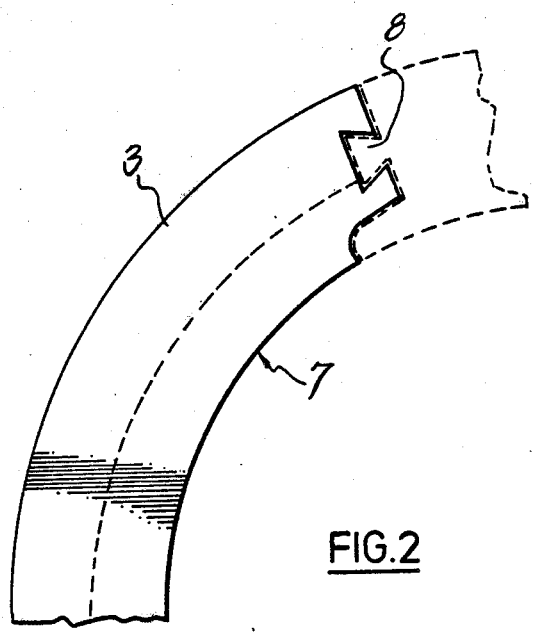

In order that the invention be better understood, a preferred embodiment of it will now be described with reference to the accompanying drawing in which:

FIG. 1 is a cross-sectional view of part of a gasket in accordance with the invention and, FIG. 2 is a plan view of part of the gasket of FIG. 1.

In FIG. 1, the gasket is made up of three expanded graphite layers. Two of these, 3 and 4, form the gasket faces, the third, 5, lies between the first two. A thin steel reinforcement layer, 6, also lies between the first two graphite layers in side-by-side relation to the third layer 5. The various layers are assembled as shown and then united by pressing, using double sided adhesive tape to achieve the necessary foil-to-steel and foil-to-foil adhesion. Liquid adhesives may also be used for this purpose. It will be appreciated that whilst the cross-section is in this case uniform throughout the length of the gasket, it need not be. The width of the gasket may vary lengthwise of the gasket according to requirements; it may have any desired shape, when seen in plan view. The edge 7 is the inside edge of the gasket shown in FIG. 2, which will now be described.

FIG. 2 shows part of a circular gasket made in the manner of the gasket of FIG. 1. The edge 7 is the inside edge of the gasket; in this instance it was designed to fit between the upper and lower halves of a circular reactor vessel fitted with a central stirrer shaft. To fit the gasket around the shaft without dismantling it, the gasket is provided with a dovetail joint, 8, so that the gasket can be "opened" during installation. After installation, the dovetail is re-assembled and thin portions of expanded graphite foil placed over it on both sides of the gasket. Subsequent compression in use effectively moulds the foils and the dovetail joint into an almost integral whole so that the metal layer is protected from whatever is inside the reactor vessel.

The particular expanded graphite foil used throughout the foregoing example was that sold under the Registered Trade Mark FLEXICARB.

What I claim is:

1. A flat gasket consisting essentially of a laminate of layers of expanded graphite foil and a metallic reinforcement layer, the graphite foil layers being so disposed as to overlap with and enclose the reinforcement layer within the gasket in relation to at least one edge thereof, said one edge being that edge of the gasket which in use is exposed to an aggressive environment.

2. The gasket of claim 1 wherein the metallic reinforcement layer projects beyond the graphite foil layers at the opposite edge to said one edge and the projecting portion thereof constitutes locating means for the gasket on installation.

3. The flat gasket of claim 1 or 2 having at least one joint lengthwise thereof.

* * * * *